(12) United States Patent
Ananthanarayanan et al.

(10) Patent No.: US 7,323,653 B2
(45) Date of Patent: Jan. 29, 2008

(54) DEFORMATION RESISTANCE WELDING OF SHEET METAL, TUBES, AND SIMILAR SHAPES

(75) Inventors: Venkatasubramanian Ananthanarayanan, Beavercreek, OH (US); Desra N. Herbst, Dayton, OH (US); Dharmendra M. Ramachandra, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 330 days.

(21) Appl. No.: 10/914,837

(22) Filed: Aug. 10, 2004

(65) Prior Publication Data
US 2005/0006352 A1    Jan. 13, 2005

Related U.S. Application Data

(63) Continuation of application No. 10/253,099, filed on Sep. 24, 2002, now abandoned.

(51) Int. Cl.
*B23K 11/00* (2006.01)

(52) U.S. Cl. .................... 219/59.1; 219/78.16

(58) Field of Classification Search ............ 219/59.1, 219/78.01, 78.16, 101, 102, 104, 117.1
See application file for complete search history.

(56) References Cited

U.S. PATENT DOCUMENTS

| | | | |
|---|---|---|---|
| 2,277,871 | A | 3/1942 | Mitchell et al. |
| 3,618,817 | A | 11/1971 | Troughton |
| 4,427,869 | A | 1/1984 | Kimura et al. |

(Continued)

FOREIGN PATENT DOCUMENTS

JP    55-136584    10/1980

(Continued)

OTHER PUBLICATIONS

U.S. Appl. No. 09/969,066, Ananthanarayanan et al.

*Primary Examiner*—Kevin P. Kerns
(74) *Attorney, Agent, or Firm*—Scott A. McBain (57) ABSTRACT

Welded structures having a first and a second member formed from sheet metal, tubes, and similar shapes, are economically fabricated through use of a method for joining a second member to a first member having a folded rim extending therefrom. The folded rim defines an air gap within the folded rim. The first and second members are joined together by forcing the folded rim against the second member under sufficient pressure to flatten the folded rim to a point that there remains substantially no air gap inside the folded rim, and resistance welding together the first and second members. The second member and the rim respectively define faying surfaces thereof. The air gap inside the folded rim extends generally parallel to the faying surfaces. The faying surfaces of the rim and second member are forced against one another by applying pressure through the folded rim in a direction generally perpendicular to the faying surfaces. While applying pressure, a first level of electrical current may be passed through the first and second members for softening the rim by electrical resistance heating and causing the softened rim to deform against the second member. Pressure is maintained, and a second level of electrical current, higher than the first level of current, is applied for a time sufficient to at least partially melt the folded rim and form a deformation resistance weld between the first and second member.

17 Claims, 4 Drawing Sheets

U.S. PATENT DOCUMENTS

| | | |
|---|---|---|
| 4,480,166 A | 10/1984 | Leech |
| 4,676,427 A | 6/1987 | Constance |
| 4,677,271 A | 6/1987 | Opprecht |
| 6,186,696 B1 | 2/2001 | Valin |
| 6,287,513 B1 | 9/2001 | Grady et al. |
| 6,539,837 B2 | 4/2003 | Fanelli et al. |
| 6,586,110 B1 | 7/2003 | Obeshaw |
| 6,615,488 B2 | 9/2003 | Anders et al. |
| 6,623,048 B2 | 9/2003 | Castel et al. |
| 6,693,251 B1 * | 2/2004 | Ananthanarayanan et al. .......... 219/59.1 |

FOREIGN PATENT DOCUMENTS

WO 2004/028730 4/2004

* cited by examiner

DEFORMATION RESISTANCE WELDING OF SHEET METAL, TUBES, AND SIMILAR SHAPES

CROSS REFERENCE TO RELATED APPLICATIONS

The present application is a continuation application of U.S. application Ser. No. 10/253,099 filed Sep. 24, 2002 now abandoned.

TECHNICAL FIELD OF THE INVENTION

This invention relates to metallurgy, and more particularly to a method for metallurgically joining two members.

BACKGROUND OF THE INVENTION

Resistance welding of a first metal member to a second metal member (also known as electric-resistance welding) is a known metallurgical process wherein the first and second metal members are heated by their own electrical resistance to a semi-fused or a fused state by the passage of very heavy electrical currents through the members for very short lengths of time, and are then welded together, by forcing the first and second members together under pressure while the welding current is applied across the members. Resistance welding has many advantages in efficiently and effectively providing consistently reliable welds in high-volume manufacturing operations, when compared to alternative brazing or welding methods using gas torches or electrical arcs.

In order to achieve a complete resistance weld of the interface between the two mating members, the members must fit together very tightly at the interface at the time welding current is applied. The need for having the members fit together tightly, makes it so difficult to economically resistance weld together thin-walled metal members, in the form of sheets, tubes, or similar shapes, in high-volume production, even where the configuration of the members is fairly simple, that such members are typically brazed or arc welded together rather than being resistance welded.

For example, in the past, prior to joining a metal sheet to a tube intersecting the sheet at an angle, the mating edges or surfaces of the members to be joined had to be cut or prepared along a three-dimensional contour so that the intersection between the members would fit together tightly enough before welding to allow a good weld joint to be made. This can be very difficult to achieve in thin-walled members that tend to flex under the pressure of the tooling used for preparing the mating edges or surfaces. The manufacturing costs for preparing the edges of the members to achieve an acceptably tight fit before welding, together with the cost of engineering for designing the members themselves and the equipment used for machining the members to achieve a tightly filling interface is undesirably high.

In addition to the cost associated with machining the members, complex fixtures were required in the past to hold the members in position and to apply pressure along an interface, which is often three-dimensional, during resistance welding of the interface.

Commonly assigned U.S. patent application Ser. No. 09/969,066, titled "Method For Metallurgically Attaching Together Two Members" by Ananthanarayanan, et al, which is incorporated herein by reference, provides a method for resistance welding together an interface between two annular shaped members having one member fitted into a hole in the second member. One member includes a through hole having a longitudinal axis and first and second longitudinal ends, and a longitudinally projecting flange surrounding the hole. The second member includes a solid transversely-projecting annular rim. The second member is partially disposed through the hole in the first member with the flange of first member projecting away from the rim of the second member, and applying clamping pressure and electrical current through electrodes to form a weld, wherein after the weld is created, the rim of the second member is seated on the first member at the first longitudinal end of the through hole. The method may be used for second members fitting into the hole in the first member with either an interference or a non-interference fit between the first and second members. The electrodes may be used for longitudinally compressing the transversely-projecting solid annular rim, and transversely compressing the longitudinally projecting flange during the welding process to achieve a fit tight enough for a high quality resistance weld to be made at the interface between the first and second members.

While the approach disclosed by Ser. No. 09/969,066 to Anananthanarayanan, et al, works well with certain annular shaped members, such as tubes, and alleviates many of the problems described above, further improvement is desirable to allow resistance welding of non-annular shaped members, and to further facilitate resistance welding of thin-walled annular shaped members.

What is needed, therefore, is an improved method for resistance welding of thin-walled sheet metal tubes and similar shapes.

SUMMARY OF THE INVENTION

Our invention provides such an improved method for resistance welding of thin-walled sheet metal tubes and similar shaped members, through utilization of a folded rim on one of the members that defines an air gap inside the folded rim. The folded rim is forced against the other member under sufficient pressure to flatten the folded rim to a point that there remains substantially no air gap inside the folded rim, and the members are resistance welded together.

Through practice of our invention, thin-walled sheet metal tubes and similar shaped members can be welded together with significantly less need for a close pre-weld fit between the members than was required in prior methods for joining such thin walled members. Our invention may also be used with members of non-annular shape.

The folded rim on the first of the two members, and the second member, may define faying surfaces, with the air gap inside the folded rim extending generally parallel to the faying surfaces of the members. The method may further comprise forcing the faying surfaces of the folded rim and second member against one another by applying pressure through the folded rim in a direction generally perpendicular to the faying surfaces.

The first and second members may define a juncture between one another, intersecting and extending from the faying surfaces, and the method may further include engaging the folded rim of the first member with a first electrode having a portion thereof extending beyond the folded rim, and applying pressure against the folded rim with the first electrode in a first direction generally perpendicular to the faying surfaces. The second member is engaged with a second electrode, and pressure is applied against the second member with the second electrode in a direction opposite the first direction. An electrical current may then be applied between the electrodes for resistance heating of the first and second members, and the first electrode moved toward the second electrode, while resistance welding together the first and second members, to a point where the portion of the first electrode extending beyond the folded rim contacts the second member. Pressure and electrical current may be continued after the portion of the first electrode extending beyond the folded rim contacts the second member, to thereby continue resistance heating of the juncture and force a portion of the material from the melted folded rim to flow into the juncture between the first and second members for welding them together.

Pressure and a first level of electrical current flow through the first and second members may be continued for a first period of time for softening the rim by electrical resistance heating and causing the softened rim to deform against the second member. A second level of electrical current higher than the first level of current may then be applied for a second period of time sufficient to at least partially melt the folded rim and form a deformation resistance weld between the first and second member. The method may further include applying the second level of electrical current for a period of time sufficient to substantially completely melt the folded rim. The first and second members may define a juncture thereof intersecting and extending from the faying surfaces, and the pressure and electrical current at the second level are maintained for a period of time sufficient for a portion of the material from the melted folded rim to flow into the juncture and weld together the first and second members.

The foregoing and other features and advantages of our invention will become further apparent from the following detailed description of exemplary embodiments, read in conjunction with the accompanying drawings. The detailed description and drawings are merely illustrative of our invention rather than limiting, the scope of the invention being defined by the appended claims and equivalents thereof.

DETAILED DESCRIPTION OF THE PRESENTLY PREFERRED EMBODIMENTS

Figure 1A:
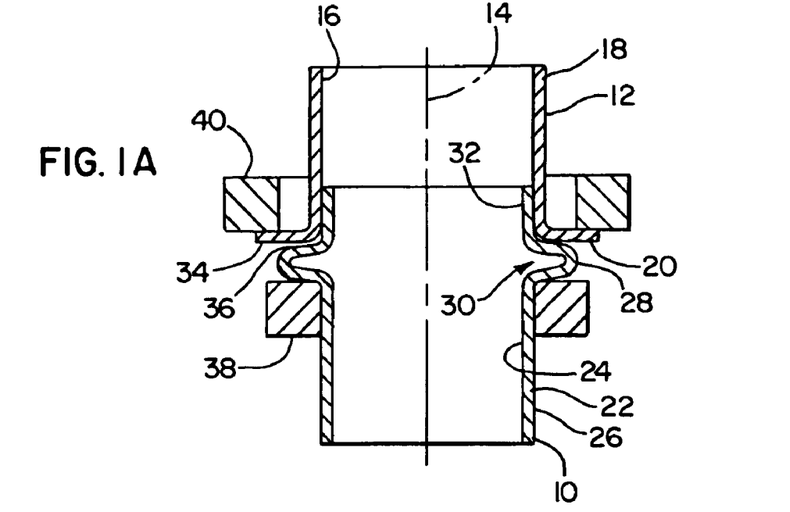
FIGS. 1A through 1C are progressive cross sections of an exemplary embodiment of welded joint between two tubes joined co-linearly end-to-end through the use of folded rim, by the method of our invention.
Figure 1B:
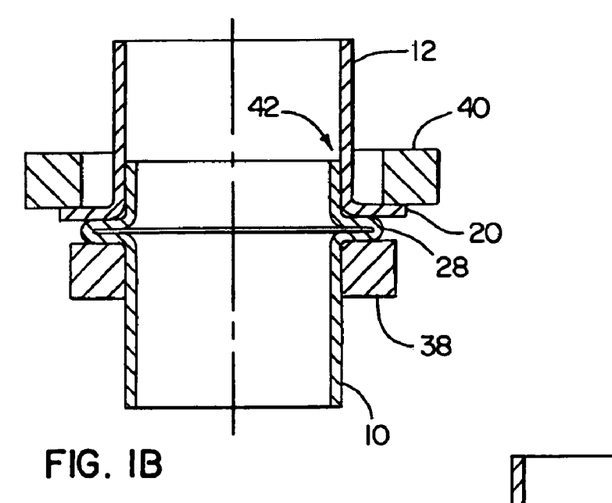
Figure 1C:
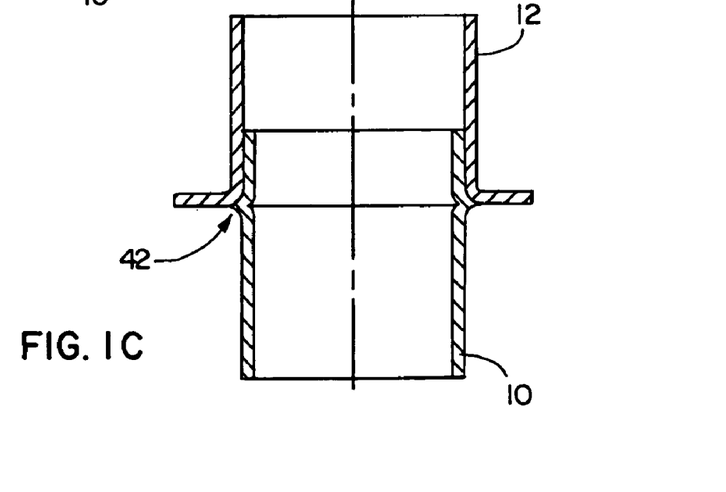

FIGS. 1A through FIG. 1C sequentially depict an exemplary embodiment of our invention for joining a second thin-walled sheet metal member, in the form of a second tube 12, to a first thin-walled sheet metal member, in the form of a first tube 10, by a process that we call "deformation resistance welding."

The second tube 12 defines a longitudinal axis 14, and an inside and an outside surface 16, 18 of the second tube 12. The lower axial end, as oriented in FIGS. 1-3, of the second tube 12 is formed outward to form an annular shaped flange 20 extending generally transversely to the longitudinal axis 14.

Figure 2:
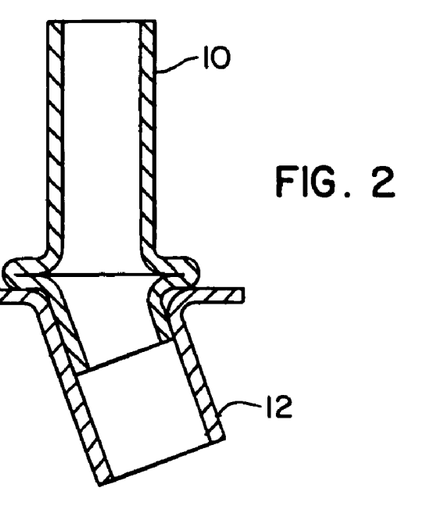
FIG. 2 is a cross section of an exemplary embodiment of welded joint between two tubes joined end-to-end, at an angle to one another, by the method of our invention.
Figure 3:
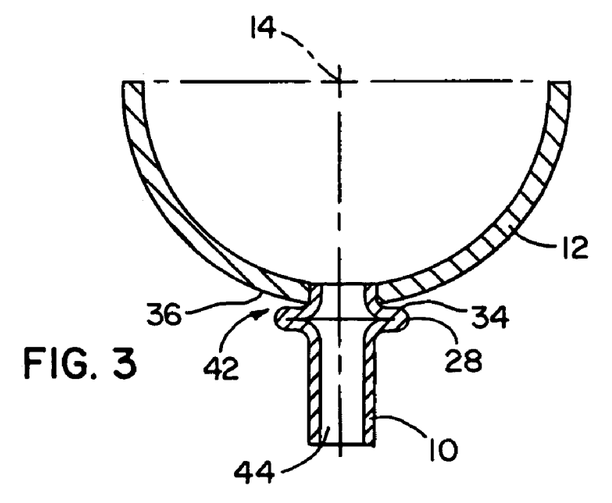
FIG. 3 is a cross section showing a small tube welded to a large tube, by the method of our invention, with the axis of the smaller tube oriented perpendicularly to the axis of the larger tube.

The first tube 10 includes an annular wall 22 having inside and outside surfaces 24, 26, with a portion of the annular wall 22 being shaped to form a folded rim 28 extending radially outward from the outer surface 26 of the first tube 10 in a generally transverse direction to the longitudinal axis 14. The inner surface 24 of the wall 22 of the first tube 10 defines an air gap 30 inside of the folded rim 28. The upper end, as shown in FIGS. 1-3, of the first tube 10 includes a piloting portion 32 thereof extending longitudinally from the folded rim 28, for insertion into the open end of the second tube 12 inside of the annular flange 20.

The lower surface of the annular flange 20 of the second member 10 and the upper surface of the folded rim 28 respectively define faying (i.e. mating) surfaces 34, 36 thereof. The air gap 30 inside the folded rim 28 extends in a direction generally parallel to the faying surfaces 34, 36, both prior to and after resistance welding the first and second tubes 10, 12 together.

With the piloting portion 32 of the first tube 10 inserted into the second tube 12 and the faying surfaces 34, 36 contacting one another, as described above and shown in FIG. 1A, a welded joint is formed between the first and second tubes 10, 12 by forcing the folded rim 28 against the annular flange 20 of the second member 12 under sufficient pressure to flatten the folded rim 28 to a point, as shown in FIG. 1B, where there remains substantially no air gap 30 inside the folded rim 28, and resistance welding together the first and second members 10, 12.

The folded rim 28 is forced against the annular flange 20 by engaging the folded rim 28 with a first electrode 38, and applying pressure against the folded rim 28 with the first electrode 38 in a first direction generally perpendicular to the faying surfaces 34, 36, while simultaneously engaging the annular flange 20 second member 12 with a second electrode 40, and applying pressure against the flange 20 with the second electrode 40 in a direction opposite the first direction. The folded rim 28 is flattened by applying sufficient pressure through the electrodes 38, 40, and moving at least one of the first and second electrodes 38, 40 toward the other electrode 38, 40, while resistance welding together the first and second tubes 10, 12, by applying an electrical current between the electrodes 38, 40 for resistance heating of the first and second members 10, 12 to a temperature that a metallurgical bond is formed at the faying surfaces 34, 36 and between the portion of the inner surface 24 within the flattened folded rim 28.

With some materials and joint configurations, it is advantageous apply pressure and a first level of electrical current flow through the first and second members 10, 12 for a first period of time, for softening the rim 28 by electrical resistance heating and causing the softened rim 28 to deform against the second member 12, under the pressure exerted by the electrodes 38, 40. A second level of electrical current, higher than the first level of current, is then applied for second period of time sufficient to at least partially melt the folded rim 28, and form a deformation resistance weld between the first and second members 10, 12.

The space formed between the faying surfaces 34, 36 of the first and second members 10, 12 defines a juncture 42 between the members 10, 12 that may be either a tight press fit, or be a looser fit to provide a small gap between the faying surfaces 34, 36. The length of time that current is maintained at the second level for resistance welding of the juncture 42 will depend upon the degree of melting that is desired for a particular joint.

For the joint shown in FIG. 1C, pressure and electrical current at the second level have been maintained at a level and for a period of time sufficient to substantially completely melt the folded rim 28 and force the melted material from the folded rim 28 into the juncture 42 between the first and second tubes 10, 12. To facilitate complete melting of the folded rim 28, and the flow of the material from the melted folded rim 28 into the juncture 42, the first electrode 38 includes a portion 44 thereof that extends radially beyond the folded rim, in such a manner that the portion 44 of the first electrode 38 extending beyond the folded rim 28 contacts the flange 20 second member 12, as pressure and movement of the electrodes are continued during the deformation resistance welding process. When the first electrode 38 has been moved into contact with the second tube 12, resistance heating of the juncture 42 is continued while a portion of the material from the melted folded rim 28 is forced into the juncture 42, to thereby facilitate flow of the melted material into the juncture 42 between the first and second members 10, 12 for welding them together. In this manner, the melted material can be forced to flow through a fairly long juncture 42, and the members 10, 12 to be joined can be maintained at an optimum temperature for ensuring that a complete and high quality weld is formed.

In some joints, it may be desirable to not completely melt the folded rim 28, but rather to maintain the pressure and electrical current at the second level only long enough to partially melt the folded rim 28 so that the faying surfaces 34, 36, and the inner surface 24 of the first element 10 within the folded rim 28 are resistance welded together, resulting in a joint having a reinforced welded rim, essentially as depicted in FIG. 1B.

Where it is desirable to heat a joint to a first temperature for a first period of time to soften and allow pressure forming of folded rim 28, and to then continue heating the joint at a second level of current for a second period of time to completely melt the folded rim 28 during welding, we have found that the first level of electrical current applied during forming of the folded rim 28 may be approximately half of the second level of current applied during welding, and that the first and second periods of time may be substantially the same duration. It may also be desirable for some materials to pulse the current during either or both of the forming and welding operations. The specific current levels and heating periods will, of course, vary dependent upon factors including the joint configuration, the materials used for the members, and the physical shape and thickness of the members, as is illustrated by the following examples:

EXAMPLE 1

| SHAPE: | Tubular members .125 inches inside diameter |
|---|---|
| THICKNESS: | .050 inch wall thickness |
| FORMING CURRENT: | 3-4 thousand amps; pulsed for 5-10 cycles at 60 Hz. |
| FORMING PRESSURE: | 300 pounds force |
| WELDING CURRENT: | 6-8 thousand amps; pulsed for 5-10 cycles at 60 Hz. |
| WELDING PRESSURE: | 300 pounds force |

EXAMPLE 2

| SHAPE: | Tubular members 4-5 inches inside diameter |
|---|---|
| THICKNESS: | .125 inch wall thickness |
| FORMING CURRENT: | 60 to 75 thousand amps; for 1 second |
| FORMING PRESSURE: | 800 to 1000 pounds force |
| WELDING CURRENT: | 125 to 150 thousand amps for one second |
| WELDING PRESSURE: | 800 to 1000 pounds force |

Those having skill in the art will recognize that our invention may be practiced in many arrangements, within the scope of our invention, other than the exemplary embodiments specifically described thus far. For example, our method may be utilized for joining two tubes 10, 12, end-to-end as described above, but at an angle as shown in FIG. 2, rather than co-linearly as was the case in the joint shown in FIGS. 1A-1C. In the joint shown in FIG. 3, a small tube 10 is welded to a large tube 12, with the axis 44 of the smaller tube 10 oriented perpendicularly to the axis 14 of the larger tube 12. It will be appreciated that for a joint of this type, the ability to form the folded rim 28 against the compound curvature of the faying surfaces 34, 36 at the juncture 42 of the tubes 10, 12, eliminates the close tolerance machining required in prior joining methods, and considerably simplifies and facilitates both construction and operation of the equipment used to make the joint.

Figure 4A:
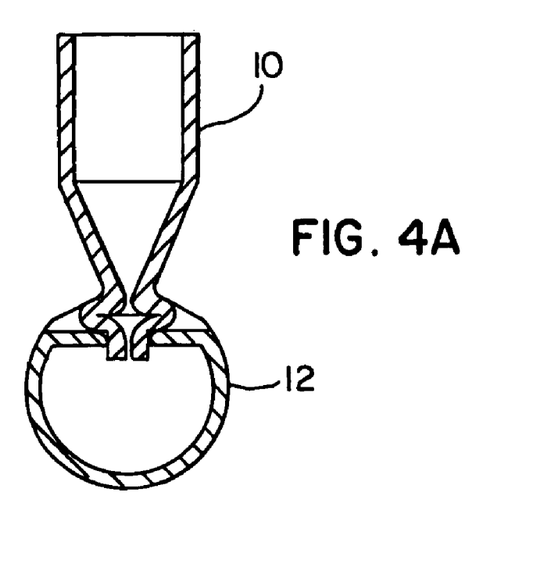
FIGS. 4A and 4B show two tubes of similar diameter joined to form a tee junction, by the method of our invention, with additional forming operations used in conjunction with the folded rim of our invention to provide an oval end on one tube and localized flattening the wall of the second tube.
Figure 4B:
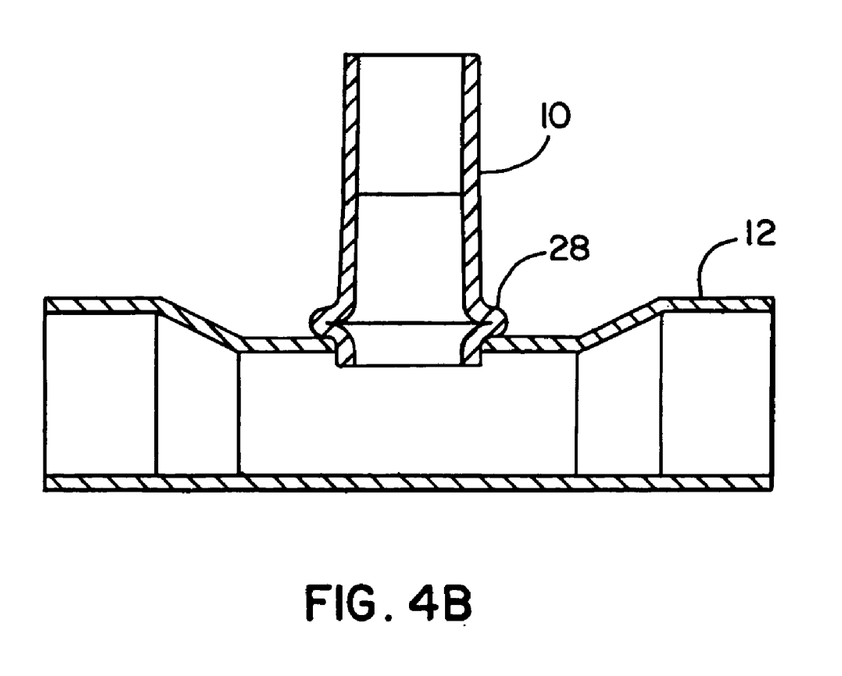

FIGS. 4A and 4B show two tubes 10, 12 of similar diameter joined to form a tee junction. FIGS. 4A and 4B also illustrate an example of a joint having additional forming operations, specifically forming an oval end on one tube 10 and locally flattening the wall of the second tube 12, used in conjunction with the folded rim 28 to form a deformation resistance weld according to our invention.

Figure 5:
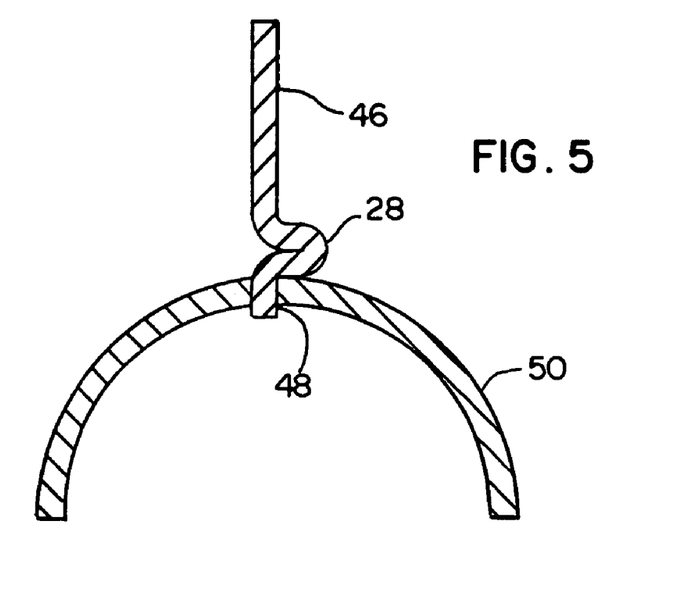
FIG. 5 shows an application of our method in a joint having a non-tubular member in the form of a flat stamping having a folded rim, welded into a slot in a tube, according to our invention.
Figure 6:
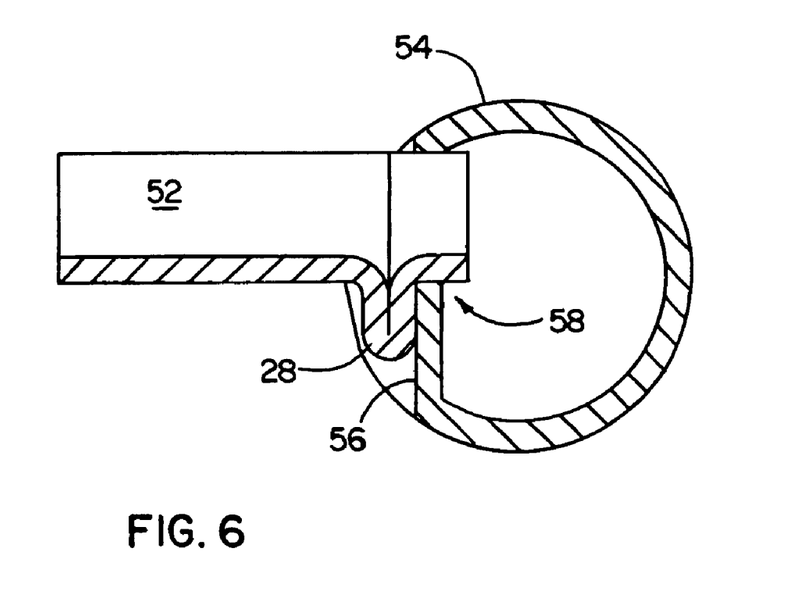
FIG. 6 shows a U-shaped channel having a folded rim, welded to a tube having a locally flattened area with a notch for receiving the end of the channel and the folded rim, according to our invention.

Our invention may also be utilized to join non-tubular members. FIG. 5 shows a flat stamping 46 having a folded rim 28, welded into a slot 48 in a tube 50. FIG. 6 shows a U-shaped channel 52 having a folded rim 28, welded to a tube 54 having a locally flattened area 56 with an notch 58 for receiving the end of the channel 52 and the folded rim 28.

Figure 7:
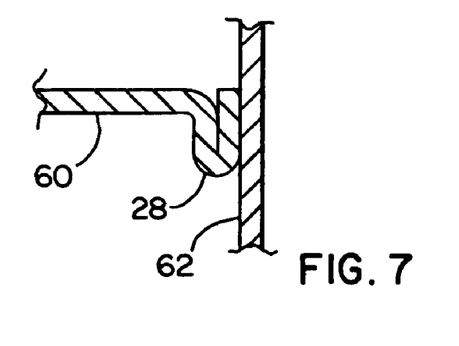
FIG. 7, shows a butt welded joint, according to our invention, between a first member having a folded rim and a second member.

As shown in FIG. 7, our invention may also be used for butt welding a first member 60 having a folded rim 28 to a second member 62, without the use of a piloting portion 32 of the embodiment depicted in FIGS. 1A through 1C.

We wish to expressly state that our invention may be utilized with virtually any metal that can be resistance welded, including steel and aluminum. Our invention may be practiced with either AC welding equipment, or DC welding equipment of either polarity. Our invention may also be practiced using fluxing or filler materials added as plating on the faying surfaces, or in other forms, to facilitate completing the weld.

In summary therefore, while the embodiments of our invention disclosed herein are presently considered to be preferred, various changes and modifications can be made without departing from the spirit and scope of the invention. The scope of the invention is indicated in the appended claims, and all changes or modifications within the meaning and range of equivalents are intended to be embraced therein.

We claim:

1. A method for joining a second member to a first member having a folded rim extending therefrom, with the folded rim defining an air gap therein, the method comprising:

engaging the folded rim of the first member with a first electrode contacting only the first member;

engaging the second member with a second electrode contacting only the second member;

forcing the folded rim against the second member under sufficient pressure to flatten the folded rim to a point that there remains substantially no air gap inside the folded rim; and resistance welding together the first and second members by partially, but not completely, melting the folded rim, wherein the second member and folded rim respectively define faying surfaces thereof, the air gap inside the folded rim extends generally parallel to the faying surfaces, and the method further comprises:

forcing the faying surfaces of the folded rim and second member against one another by applying pressure through the folded rim in a direction generally perpendicular to the faying surfaces, wherein the first and second members define a juncture thereof intersecting and extending from the faying surfaces, and the method further comprises:

engaging the folded rim of the first member with a first electrode having a portion thereof extending beyond the folded rim;

applying pressure against the folded rim with the first electrode in a first direction generally perpendicular to the faying surfaces;

engaging the second member with a second electrode;

applying pressure against the second member with the second electrode in a direction opposite the first direction;

applying an electrical current between the electrodes for resistance heating of the first and second members;

moving the first electrode toward the second electrode, while resistance welding together the first and second members, to a point where the portion of the first electrode extending beyond the folded rim contacts the second member; and continuing to apply pressure and electrical current after the portion of the first electrode extending beyond the folded rim contacts the second member, to thereby continue resistance heating of the juncture and force a portion of the material from the melted folded rim to flow into the juncture between the first and second members for welding them together.

2. A method for joining a second member to a first member having a folded rim extending therefrom, with the folded rim defining an air gap therein, the method comprising:

engaging the folded rim of the first member with a first electrode contacting only the first member;

engaging the second member with a second electrode contacting only the second member;

forcing the folded rim against the second member under sufficient pressure to flatten the folded rim to a point that there remains substantially no air gap inside the folded rim; and resistance welding together the first and second members by partially, but not completely, melting the folded rim, wherein the second member and folded rim respectively define faying surfaces thereof, the air gap inside the folded rim extends generally parallel to the faying surfaces, and the method further comprises:

forcing the faying surfaces of the folded rim and second member against one another by applying pressure through the folded rim in a direction generally perpendicular to the faying surfaces, applying pressure and a first level of electrical current flow through the first and second members for a first period of time for softening the rim by electrical resistance heating and causing the softened rim to deform against the second member, and applying a second level of electrical current higher than the first level of current for a second period of time sufficient to at least partially melt the folded rim and form a deformation resistance weld between the first and second member.

3. The method of claim 2 further comprising applying the second level of electrical current for a period of time sufficient to substantially completely melt the folded rim.

4. The method of claim 2, wherein the first level of current is about one half of the second level of current.

5. The method of claim 2, wherein the first and second periods of time are substantially equal in length.

6. The method of claim 3 wherein the first and second members define a juncture thereof intersecting and extending from the faying surfaces, and the pressure and electrical current at the second level are maintained for a period of time sufficient for a portion of the material from the melted folded rim to flow into the juncture and weld together the first and second members.

7. The method of claim 6 wherein the juncture of the first and second members defines a gap therebetween for receipt of a portion of the material from the melted folded rim.

8. A method for joining a second member to a first member having a folded rim extending therefrom, with the folded rim defining an air gap therein, the method comprising:

engaging the folded rim of the first member with a first electrode contacting only the first member;

engaging the second member with a second electrode contacting only the second member;

forcing the folded rim against the second member under sufficient pressure to flatten the folded rim to a point that there remains substantially no air gap inside the folded rim; and resistance welding together the first and second members by partially, but not completely, melting the folded rim, wherein the second member and folded rim respectively define faying surfaces thereof, the air gap inside the folded rim extends generally parallel to the faying surfaces, and the method further comprises:

forcing the faying surfaces of the folded rim and second member against one another by applying pressure through the folded rim in a direction generally perpendicular to the faying surfaces, applying pressure and a first level of electrical current flow through the first and second members for a first period of time for softening the rim by electrical resistance heating and causing the softened rim to deform against the second member, and applying a second level of electrical current higher than the first level of current for a second period of time sufficient to at least partially melt the folded rim and form a deformation resistance weld between the first and second member, and further comprising applying the second level of electrical current for a period of time sufficient to substantially completely melt the folded rim, wherein the first and second members define a juncture thereof intersecting and extending from the faying surfaces, and the pressure and electrical current at the second level are maintained for a period of time sufficient for a portion of the material from the melted folded rim to flow into the juncture and weld together the first and second members, and wherein the folded rim and second member define corresponding faying surfaces thereof, and the method further comprises:

engaging the folded rim of the first member with a first electrode having a portion thereof extending beyond the folded rim;

applying pressure against the folded rim with the first electrode in a first direction generally perpendicular to the faying surfaces;

engaging the second member with a second electrode;

applying pressure against the second member with the second electrode in a direction opposite the first direction;

applying an electrical current between the electrodes for resistance heating of the first and second members;

moving the first electrode toward the second electrode, while resistance welding together the first and second members, to a point where the portion of the first electrode extending beyond the folded rim contacts the second member; and continuing to apply pressure and electrical current after the portion of the first electrode extending beyond the folded rim contacts the second member, to thereby continue resistance heating of the juncture and force a portion of the material from the melted folded rim to flow into the juncture between the first and second members for welding them together.

9. A method for deformation resistance welding together a first and a second member, the method comprising:

pre-forming a folded rim on the first member, the folded rim having a faying surface thereof generally contoured to mate with a corresponding faying surface of the second member, the folded rim also defining an air gap inside thereof extending generally parallel to the faying surfaces;

engaging the folded rim of the first member with a first electrode contacting only the first member and applying pressure against the folded rim with the first electrode in a first direction generally perpendicular to the faying surfaces;

engaging the second member with a second electrode contacting only the second member and applying pressure against the second member with the second electrode in a direction opposite the first direction;

forcing the faying surfaces of the folded rim and second member against one another by applying pressure to the folded rim in a direction generally perpendicular to the faying surfaces against the second member;

applying a first level of electrical current through the first and second members for a first period of time sufficient for softening the folded rim by electrical resistance heating and causing the softened rim to deform and flatten against the second member to a point that there remains substantially no air gap inside the folded rim; and applying a second level of electrical current higher than the first level of current for a second period of time sufficient to at least partially melt the folded rim and form a deformation resistance weld between the first and second member by partially, but not completely, melting the folded rim.

10. A method for deformation resistance welding together a non-tubular first member and a non-tubular second member, the method comprising:

pre-forming a folded rim on the first member, the folded rim having a faying surface thereof generally contoured to mate with a corresponding faying surface of the second member, the folded rim also defining an air gap inside thereof extending generally parallel to the faying surfaces;

engaging the folded rim of the first member with a first electrode contacting only the first member and applying pressure against the folded rim with the first electrode in a first direction generally perpendicular to the faying surfaces;

engaging the second member with a second electrode contacting only the second member and applying pressure against the second member with the second electrode in a direction opposite the first direction;

forcing the faying surfaces of the folded rim and second member against one another by applying pressure to the folded rim in a direction generally perpendicular to the faying surfaces against the second member;

applying a first level of electrical current through the first and second members for a first period of time sufficient for softening the folded rim by electrical resistance heating and causing the softened rim to deform and flatten against the second member to a point that there remains substantially no air gap inside the folded rim; and applying a second level of electrical current higher than the first level of current for a second period of time sufficient to at least partially melt the folded rim and form a deformation resistance weld between the first and second member.

11. A method for deformation resistance welding together a first and a second tube, wherein the second tube has a longitudinally extending wall and a non-longitudinally extending portion, the method comprising:

pre-forming a folded rim on the first tube, the folded rim having a faying surface thereof generally contoured to mate with a corresponding faying surface of the second tube, the folded rim also defining an air gap inside thereof extending generally parallel to the faying surfaces;

engaging the folded rim of the first tube with a first electrode contacting only the first member and applying pressure against the folded rim with the first electrode in a first direction generally perpendicular to the faying surfaces;

engaging the second tube with a second electrode contacting only the second tube and only the non-longitudinally-extending portion of the second tube creating a radial gap between the second electrode and the longitudinally extending wall of the second tube and applying pressure against the second tube with the second electrode in a direction opposite the first direction;

forcing the faying surfaces of the folded rim and second tube against one another by applying pressure to the folded rim in a direction generally perpendicular to the faying surfaces against the second tube;

applying a first level of electrical current through the first and second tubes for a first period of time sufficient for softening the folded rim by electrical resistance heating and causing the softened rim to deform and flatten against the second tube to a point that there remains substantially no air gap inside the folded rim; and applying a second level of electrical current higher than the first level of current for a second period of time sufficient to at least partially melt the folded rim and form a deformation resistance weld between the first and second tube.

12. A method for deformation resistance welding together a non-coated first and a non-coated second member, the method comprising:

pre-forming a folded rim on the first member, the folded rim having a faying surface thereof generally contoured to mate with a corresponding faying surface of the second member, the folded rim also defining an air gap inside thereof extending generally parallel to the faying surfaces;

engaging the folded rim of the first member with a first electrode contacting only the first member and applying pressure against the folded rim with the first electrode in a first direction generally perpendicular to the faying surfaces;

engaging the second member with a second electrode contacting only the second member and applying pressure against the second member with the second electrode in a direction opposite the first direction;

forcing the faying surfaces of the folded rim and second member against one another by applying pressure to the folded rim in a direction generally perpendicular to the faying surfaces against the second member;

applying a first level of electrical current through the first and second members for a first period of time sufficient for softening the folded rim by electrical resistance heating and causing the softened rim to deform and flatten against the second member to a point that there remains substantially no air gap inside the folded rim; and applying a second level of electrical current higher than the first level of current for a second period of time sufficient to at least partially melt the folded rim and form a deformation resistance weld between the first and second member.

13. A method for joining a second member to a first member having a folded rim extending therefrom and having a piloting portion, with the piloting portion disposed in the second member, with the folded rim defining an air gap therein and with the folded rim having an inner surface wherein substantially no portion of the inner surface of the folded rim is in folded contact with any other portion of the inner surface of the folded rim, the method comprising:

engaging the folded rim of the first member with a first electrode contacting only the first member;

engaging the second member with a second electrode contacting only the second member;

forcing the folded rim against the second member under sufficient pressure to flatten the folded rim to a point that there remains substantially no air gap inside the folded rim; and resistance welding together the first and second members.

14. A method for joining a second member to a first member by deformation resistance heating, wherein the first member has a piloting portion, the method comprising;

pre-forming a folded rim on the first member having a faying surface thereof generally contoured to mate with a corresponding faying surface of the second member, with the folded rim also defining an air gap inside thereof extending generally parallel to the faying surfaces and with the folded rim having an inner surface wherein substantially no portion of the inner surface of the folded rim is in folded contact with any other portion of the inner surface of the folded rim;

disposing the first member to position the piloting portion in the second member;

engaging the folded rim of the first member with a first electrode contacting only the first member and applying pressure against the pre-formed folded rim with the first electrode in a first direction generally perpendicular to the faying surfaces, engaging the second member with a second electrode contacting only the second member and applying pressure against the second member with the second electrode in a direction opposite the first direction;

forcing the faying surfaces of the folded rim and second member against one another by applying sufficient pressure through the folded rim in a direction generally perpendicular to the faying surfaces against the second member to flatten the folded rim to a point that there remains substantially no air gap inside the folded rim; and applying an electrical current for resistance heating the first and second members.

15. A method for deformation resistance welding together a first and a second member, the method comprising:

pre-forming a folded rim on the first member, the folded rim having a faying surface thereof generally contoured to mate with a corresponding faying surface of the second member, the folded rim also defining an air gap inside thereof extending generally parallel to the faying surfaces and with the folded rim having an inner surface wherein substantially no portion of the inner surface of the folded rim is in folded contact with any other portion of the inner surface of the folded rim;

engaging the folded rim of the first member with a first electrode contacting only the first member and applying pressure against the folded rim with the first electrode in a first direction generally perpendicular to the faying surfaces;

engaging the second member with a second electrode contacting only the second member and applying pressure against the second member with the second electrode in a direction opposite the first direction;

forcing the faying surfaces of the folded rim and second member against one another by applying pressure to the folded rim in a direction generally perpendicular to the faying surfaces against the second member;

applying a first level of electrical current through the first and second members for a first period of time sufficient for softening the folded rim by electrical resistance heating and causing the softened rim to deform and flatten against the second member to a point that there remains substantially no air gap inside the folded rim; and applying a second level of electrical current higher than the first level of current for a second period of time sufficient to at least partially melt the folded rim and form a deformation resistance weld between the first and second member.

16. A method for deformation resistance welding together a first and a second member, the method comprising:
    pre-forming a folded rim on the first member, the folded rim having a faying surface thereof generally contoured to mate with a corresponding faying surface of the second member, the folded rim also defining an air gap inside thereof extending generally parallel to the faying surfaces and with the folded rim including an inner surface having opposing, substantially parallel, and longitudinally-spaced-apart first and second surface portions;
    engaging the folded rim of the first member with a first electrode contacting only the first member and applying pressure against the folded rim with the first electrode in a first direction generally perpendicular to the faying surfaces;
    engaging the second member with a second electrode contacting only the second member and applying pressure against the second member with the second electrode in a direction opposite the first direction;
    forcing the faying surfaces of the folded rim and second member against one another by applying pressure to the folded rim in a direction generally perpendicular to the faying surfaces against the second member;
    applying a first level of electrical current through the first and second members for a first period of time sufficient for softening the folded rim by electrical resistance heating and causing the softened rim to deform and flatten against the second member to a point that there remains substantially no air gap inside the folded rim; and
    applying a second level of electrical current higher than the first level of current for a second period of time sufficient to at least partially melt the folded rim and form a deformation resistance weld between the first and second member.

17. A method for deformation resistance welding together a second member and a first member having a wall thickness, the method comprising:
    pre-forming a folded rim on the first member, the folded rim having a faying surface thereof generally contoured to mate with a corresponding faying surface of the second member, the folded rim also defining an air gap inside thereof extending generally parallel to the faying surfaces and with the folded rim including an inner surface having opposing first and second surface portions which are longitudinally spaced apart and which have a radial extent greater than the wall thickness of the first member;
    engaging the folded rim of the first member with a first electrode contacting only the first member and applying pressure against the folded rim with the first electrode in a first direction generally perpendicular to the faying surfaces;
    engaging the second member with a second electrode contacting only the second member and applying pressure against the second member with the second electrode in a direction opposite the first direction;
    forcing the faying surfaces of the folded rim and second member against one another by applying pressure to the folded rim in a direction generally perpendicular to the faying surfaces against the second member;
    applying a first level of electrical current through the first and second members for a first period of time sufficient for softening the folded rim by electrical resistance heating and causing the softened rim to deform and flatten against the second member to a point that there remains substantially no air gap inside the folded rim; and
    applying a second level of electrical current higher than the first level of current for a second period of time sufficient to at least partially melt the folded rim and form a deformation resistance weld between the first and second member.

* * * * *